United States Patent Office 3,186,977
Patented June 1, 1965

3,186,977
THREE-COMPONENT ALKYL ALUMINUM CATALYSTS FOR OLEFIN POLYMERIZATION
Harry W. Coover, Jr., and Frederick B. Joyner, Kingsport, Tenn., assignors to Eastman Kodak Company, Rochester, N.Y., a corporation of New Jersey
No Drawing. Filed Mar. 1, 1961, Ser. No. 92,464
16 Claims. (Cl. 260—93.7)

This application is a continuation-in-part of our copending application, Serial No. 724,907, filed March 31, 1958, and now abandoned.

This invention relates to a new and improved polymerization process and is particularly concerned with the use of a novel catalyst combination for preparing high molecular weight, solid polyolefins, such as polypropylene, of high density and crystallinity. In a particular aspect the invention is concerned with the preparation of polypropylene and higher polyolefins having a high crystallinity and a high density using a particular catalyst combination which has unexpected catalytic activity.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

Catalyst compositions containing metal alkyls and transition metal compounds have been found to be effective for polymerizing olefins in low temperature, low pressure procedures and among the most effective catalysts are the mixtures of a trialkyl aluminum and either titanium trichloride or vanadium trichloride. When these catalysts are employed to polymerize propylene, the product has been found to have an inherent viscosity within the range of about 1 to 3 and a crystallinity of about 70 to 75%. Also, such polymers have inadequate stiffness, thermal stability and softening point for many commercial applications unless stabilized and subjected to rather extensive extraction procedures for removal of oils and rubbery polymers.

It is an object of this invention to provide a novel and improved process for polymerizing propylene and higher α-monoolefins to form polymers of increased inherent viscosity and molecular weight and of substantially higher crystallinity. It is a particular object of this invention to provide a novel and improved process for polymerizing propylene in the presence of an improved catalyst composition containing a trialkyl aluminum and either titanium trichloride or vanadium trichloride. As a result of the use of this improved catalyst composition the inherent viscosity and crystallinity of the polymer are unexpectedly improved resulting in a polymer of substantially increased molecular weight and impact strength and in substantially increased clarity of molded objects. Other objects of this invention will be apparent from the description and claims which follow.

The above and other objects are attained by means of this invention, wherein α-monoolefins, either singly or in admixture, are readily polymerized to high molecular weight solid polymers by effecting the polymerization in the presence of a catalytic mixture containing an aluminum compound having the formula $R_3Al$ wherein each R is a hydrocarbon radical containing 1–12 carbon atoms and selected from the group consisting of alkyl, aryl and aralkyl, a halide of a transition metal selected from the group consisting of titanium and vanadium, and a third component selected from the organophosphorus compounds having the formulas: $P(O)Y_3$ and $PY_3$ wherein each Y is an alkylamino ($-NR_2$) or alkoxy ($-OR'$), said R and R' being alkyl radicals containing 1 to 8, preferably 1 to 4, carbon atoms. Thus, the organophosphorus compounds can have the following structural formulas: $P(O)(NR_2)_3$, $P(O)(NR_2)_2(OR')_1$, $$P(O)(NR_2)(OR')_2$$

$P(O)(OR')_3$, $P(NR_2)_3$, $P(NR_2)_2(OR')$, $P(NR_2)(OR')_2$ and $P(OR_2)_3$ wherein R and R' are alkyl radicals as defined above.

Among the organophosphorus compounds that can be employed in our catalyst systems are diethyl N-dimethylamidophosphate,
ethyl N,N-tetraethyldiamidophosphate,
diethyl N-dimethylamidophosphite,
ethyl N,N-tetraethyl diamidophosphite,
N,N,N-hexaethyl triamidophosphite,
dibutyl N-dipropylamidophosphate,
n-pentyl N,N-tetrabutylamidophosphate,
dipropyl N-dioctylamidophosphite,
n-hexyl N,N-tetrabutyl diamidophosphite,
N,N,N-hexa(n-hexyl)triamidophosphite,
triethyl phosphite,
triethyl phosphate,
tributyl phosphite,
trioctyl phosphite,
N,N,N-hexamethylphosphoramide,
N,N,N-hexabutylphosphoramide,
N,N,N-hexaoctyl phosphoramide, and the like.

Catalyst mixtures that can be employed in practicing our invention are:

(1) Triethyl aluminum, titanium trichloride and diethyl N-dimethylamidophosphate;
(2) Tributyl aluminum, titanium tetrachloride and ethyl N,N-tetraethyldiamidophosphate;
(3) Trioctyl aluminum, vanadium trichloride and ethyl N-dimethylamidophosphite;
(4) Tridodecyl aluminum, vanadium tetrachloride and ethyl N,N-tetraethyl diamidophosphite;
(5) Triphenyl aluminum, titanium tribromide and N,N,N-hexaethyl triamidophosphite;
(6) Tribenzyl aluminum, titanium tetrabromide and dibutyl N-dipropylamidophosphate;
(7) Trinaphthyl aluminum, vanadium tribromide and n-pentyl N,N-tetrabutyldiamidophosphate;
(8) Trimethyl aluminum, vanadium tetrabromide and dipropyl N-dioctylamidophosphite;
(9) Tripropyl aluminum, titanium triiodide and n-hexyl N,N-tetrabutyl diamidophosphite;
(10) Triethyl aluminum, titanium tetraiodide and N,N,N-hexa(n-hexyl)triamidophosphite;
(11) Tripentyl aluminum, vanadium triiodide and triethyl phosphite;
(12) Tributyl aluminum, vanadium tetraiodide and triethyl phosphate;
(13) Triphenyl aluminum, titanium trichloride and tributyl phosphite;
(14) Tribenzyl aluminum, titanium tetrachloride and trioctyl phosphite;

(15) Triethyl aluminum, titanium trichloride and N,N,N-hexamethyl phosphoramide;

(16) Trimethyl aluminum, titanium trichloride and N,N,N-hexabutyl phosphoramide; and

(17) Triethyl aluminum, titanium trichloride and N,N,N-hexaoctyl phosphoramide.

The significantly improved properties of the polymers produced with the above catalyst were completely unexpected. The inventive process is carried out in liquid phase in an inert organic liquid and preferably an inert liquid hydrocarbon vehicle, but the reaction can be conducted in the absence of diluent. The process proceeds with excellent results over a temperature range of from 0° C. to 250° C. although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30 to 1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of highly crystalline polypropylene although it can be used for polymerizing mixtures of ethylene and propylene, the butenes and styrene as well as other $\alpha$-monoolefins containing up to 10 carbon atoms. The polypropylene produced in accordance with this invention possesses properties that are quite unexpected. The inherent viscosity and crystallinity of the polymer as well as the molecular weight, impact strength and clarity are substantially and unexpectedly improved. The high molecular weight, high density polymers of this invention are insoluble in solvents at ordinary temperatures but are partially soluble in such solvents as xylene, toluene or tetralin at elevated temperatures. These solubility characteristics make it possible to carry out the polymerization process under conditions wherein the polymer formed is soluble in the reaction medium during the polymerization and can be precipitated therefrom by lowering the temperature of the resulting mixture. The polypropylene produced by practicing this invention has a softening point above 155° C. and a density of 0.91 and higher. Usually, the density of the polypropylene is of the order of 0.91 to 0.92.

The polypropylene and other polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polypropylene obtained according to this process. Other poly-$\alpha$-olefins as well as copolymers of ethylene and propylene can also be prepared and have similarly improved properties.

As has been indicated above, the improved results obtained in accordance with this invention depend upon the particular catalyst combination. Thus, one of the components of the catalyst is an aluminum compound as defined hereinabove and preferably a trialkyl aluminum wherein the alkyl radicals contain from 1 to 12, preferably from 1 to 4, carbon atoms, for example, methyl, ethyl, propyl, butyl, and the like. R can also represent octyl, dodecyl, phenyl, benzyl and naphthyl radicals. The preferred trialkyl aluminum compounds are the lower alkyl derivatives, and the most preferred is triethyl aluminum. Another component of the catalyst composition is a trihalide of a transition metal selected from the group consisting of titanium and vanadium wherein the halogen is selected from the group consisting of chlorine, bromine and iodine. The third component of the catalyst composition is an organophosphorus compound as defined above.

The limiting factor in the temperature of the process appears to be the decomposition temperature of the catalyst. Ordinarily, temperatures from 50° C. to 150° C. are employed, although temperatures as low as 0° C. or as high as 250° C. can be employed, if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction mixture as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymer of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher, are preferred. Higher concentrations of monomer ordinarily increase the rate of polymerization, but concentrations above 5 to 10% by weight in a solution process are ordinarily less desirable because the polymer dissolved in the reaction medium results in a very viscous solution.

The molar ratio of aluminum compound to transition metal trihalide can be varied within the range of 1:0.5 to 1:2, and the molar ratio of transition metal halide to the third component of the catalytic mixture can be varied within the range of 1:1 to 1:0.1, but it will be understood that higher and lower molar ratios are within the scope of this invention. A particularly effective catalyst contains one mole of transition metal compound and 0.25 mole of the third component per mole of aluminum compound. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound, such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, tetralin, decalin, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as dsired.

A particularly effective catalyst for polymerizing propylene and other α-monoolefins in accordance with this invention is a mixture of triethyl aluminum, titanium trichloride and tris-N,N-dimethyl phosphoramide. The importance of the third component of this reaction mixture is evident from the fact that the presence of the third component makes possible the production of polymers of substantially improved properties.

The invention is illustrated by the following examples of certain preferred embodiments thereof.

*Example 1*

In a nitrogen-filled dry box 1 gram of catalyst was added to a 500 ml. presure bottle containing 100 ml. of dry heptane. The catalyst was made up of triethyl aluminum and titanium trichloride in a molar ratio of 1:1. The pressure bottle was then attached to a propylene source and the reaction mixture was agitated at 70° C. and under 30 p.s.i. of propylene pressure for 6 hours. At the end of this period, the resulting polymer was washed several times with dry methanol and then with water to remove residual catalyst. The resulting polypropylene weighed 17.2 grams and had an inherent viscosity of 2.75 and a density of 0.915.

When this run was repeated using vanadium trichloride in place of titanium trichloride the yield of polypropylene was 16.8 grams having an inherent viscosity of 1.4 and a density of 0.917.

This example demonstrates the results obtained with the prior art type of catalyst.

*Example 2*

In a nitrogen-filled dry box a dry 280 ml. stainless steel autoclave was loaded with 0.75 gram of a catalyst made up of triethyl aluminum, titanium trichloride and N,N,N-hexamethyl phosphoramide P(O)[N(CH$_3$)$_2$]$_3$ in a molar ratio of 1:1:0.5. The autoclave was capped, removed from the dry box, placed in a rocker and attached to a propylene source. A 100 ml. (51 grams) charge of propylene was added, the autoclave was rocked, heated to 70° C. and maintained there for four hours. The product was isolated by washing with methanol and water. A 49.5 gram yield of crystalline polypropylene having an inherent viscosity of 5.1 and a density of 0.92 was obtained.

Other organophosphorus compounds, such as triethyl phosphate, tributyl phosphate, trioctyl phosphate, triethyl phosphite, trioctyl phosphite, ethyl N,N-tetraethyldiamidophosphate, diethyl N-dimethylamidophosphite, ethyl N,N-tetraethyl diamidophosphite, and N,N,N-hexamethyl triamidophosphite, when used in place of the above phosphoramide produce desirable yields of highly crystalline polypropylene having improved inherent viscosity and density.

Vanadium trichloride, when used in place of titanium trichloride in the above catalyst compositions, resulted in the production of desirable yields of highly crystalline polypropylene having improved inherent viscosity and density.

*Example 3*

The process of Example 2 was followed using 1.5 grams of catalyst charge at 55° C. to produce 34.8 grams of highly crystalline polypropylene having a density of 0.92. In an attempt to measure inherent viscosity the polymer was found to be insoluble in tetralin at 145° C.

*Example 4*

The process of Example 2 was followed using 0.1 gram of catalyst charge at a temperature of 85° C. The yield of crystalline polypropylene was 17.4 grams having a density of 0.92 and an inherent viscosity of 3.17.

*Example 5*

The procedure of Example 2 was followed using a 1:2:0.2 molar ratio of triethyl aluminum, titanium trichloride and tris-N,N-dimethyl phosphoramide with a total catalyst charge of 1 gram. A polymerization temperature of 150° C. was used with 3-methyl-1-butene as the monomer. A 39 gram yield of highly crystalline poly-3-methyl-1-butene having an inherent viscosity of 2.45 was obtained. When the phosphoramide was not present in the catalyst, the yield of polymer was 20 grams of oily, amorphous product and 12.7 grams of crystalline product having an inherent viscosity of 2.12.

Titanium tetrachloride, vanadium trichloride and vanadium tetrachloride, when used in place of titanium trichloride in the above catalyst, produce equally desirable results.

*Example 6*

The process of Example 2 was followed using an equal molar quantity of triphenyl aluminum in place of triethyl aluminum. The yield of crystalline polyproplyene was 42.5 grams having a density of 0.92.

*Example 7*

The process of Example 2 was followed using an equal molar quantity of tridodecyl aluminum in place of triethyl aluminum. The yield of crystalline polypropylene was 35 grams having a density of 0.919.

*Example 8*

The process of Example 2 was followed using an equal molar quantity of dimethylbutyl aluminum in place of triethyl aluminum. The yield of crystalline polypropylene was 39 grams having a density of 0.918.

In a similar manner increased crystallinity and molecular weight are obtained in polymers produced from 1-butene, 1-pentene, 4-methyl-1-pentene, styrene, fluorostyrene and vinyl cyclohexane.

The diluents that are employed in practicing this invention can be advantageously purified prior to use in the polymerization reaction by contacting the diluent, for example, in a distillation procedure or otherwise, with the polymerization catalyst to remove undesirable impurities. Also, prior to such purification of the diluent the catalyst can be contacted advantageously with polymerizable α-monoolefins.

Thus, by means of this invention polyolefins such as polypropylene are readily produced using a catalyst combination whose improved effectiveness could not have been predicted. The polymers thus obtained can be extruded, mechanically milled, cast or molded as desired. The polymers can be used as blending agents with relatively more flexible polyhydrocarbons to give any desired combination of properties. The polymers can also be blended with antioxidants, stabilizers, plasticizers, fillers, pigments, and the like, or mixed with other polymeric materials, waxes and the like.

From the detailed disclosure of this invention it is quite apparent that in this polymerization procedure a novel catalyst, not suggested in prior art polymerization procedures, is employed. As a result of the use of this novel catalyst it is possible to produced polymeric hydrocarbons, particularly polypropylene, having properties not heretofore obtainable. For example, polypropylene prepared in the presence of catalyst combinations within the scope of this invention is substantially free of rubbery and oily polymers and thus it is not necessary to subject such polypropylene of this invention to extraction procedures in order to obtain a commercial product. Also, polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols, such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

Although the invention has been described in considerable detail with reference to certain preferred embodiments thereof, variations and modifications can be effected within the spirit and scope of this invention as described hereinabove and as defined in the appended claims.

We claim:

1. In the polymerization of α-olefinic hydrocarbons containing 3 to 10 carbon atoms to form solid, crystalline polymer, the improvement which comprises catalyzing the polymerization with a catalytic mixture containing an aluminum compound having the formula $R_3Al$ wherein each R is a hydrocarbon radical containing 1 to 12 carbon atoms and selected from the group consisting of alkyl, aryl and aralkyl, a trihalide of a transition metal selected from the group consisting of titanium and vanadium and an organophosphorus compound having the formulas $P(O)Y_3$ and $PY_3$ wherein each Y is selected from the group consisting of alkylamino and alkoxy radicals, the alkyl and alkoxy radicals containing 1 to 8 carbon atoms, the molar ratio of transition metal trihalide to organophosphorus compound being within the range of 1:1 to 1:0.1.

2. In the polymerization of propylene to form solid, crystalline polymer, the improvement which comprises effecting the polymerization in the presence of a catalytic mixture of a trialkyl aluminum wherein the alkyl radicals contain 1 to 12 carbon atoms, a titanium trihalide and a trialkyl phosphite wherein the alkyl radicals contain 1 to 8 carbon atoms, the molar ratio of titanium trihalide to trialkyl phosphite being within the range of 1:1 to 1:0.1.

3. In the polymerization of propylene to form solid, crystalline polymer, the improvement which comprises effecting the polymerization in the presence of a catalytic mixture of a trialkyl aluminum wherein the alkyl radicals contain 1 to 12 carbon atoms, a titanium trihalide and a trialkyl phosphate wherein the alkyl radicals contain 1 to 8 carbon atoms, the molar ratio of titanium trihalide to trialkyl phosphate being within the range of 1:1 to 1:0.1.

4. In the polymerization of propylene to form solid, crystalline polymer, the improvement which comprises effecting the polymerization in the presence of the catalytic mixture of a trialkyl aluminum wherein the alkyl radicals contain 1 to 12 carbon atoms, a titanium trihalide and a hexaalkyl phosphoramide wherein the alkyl radicals contain 1 to 8 carbon atoms, the molar ratio of titanium trihalide to hexaalkyl phosphoramide being within the range of 1:1 to 1:0.1.

5. In the polymerization of propylene to form solid, crystalline polymer, the improvement which comprises effecting the polymerization in the presence of a catalytic mixture consisting essentially of triethyl aluminum, titanium trichloride and tris - N,N - dimethylphosphoramide, the molar ratio of titanium trichloride to tris-N,N-dimethylphosphoramide being within the range of 1:1 to 1:0.1.

6. In the polymerization of propylene to form solid, crystalline polymer, the improvement which comprises effecting the polymerization in the presence of a catalytic mixture consisting essentially of triethyl aluminum, vanadium trichloride and tris - N,N - dimethylphosphoramide, the molar ratio of vanadium trichloride to tris-N,N-dimethylphosphoramide being within the range of 1:1 to 1:0.1.

7. In the polymerization of propylene to form solid, crystalline polymer, the improvement which comprises effecting the polymerization in the presence of a catalytic mixture consisting essentially of triethyl aluminum, titanium trichloride and triethyl phosphate, the molar ratio of titanium trichloride to triethyl phosphate being within the range of 1:1 to 1:0.1.

8. In the polymerization of propylene to form solid, crystalline polymer, the improvement which comprises effecting the polymerization in the presence of a catalytic mixture consisting essentailly of triethyl aluminum, titanium trichloride and triethyl phosphite, the molar ratio of titanium trichloride to triethyl phosphite being within the range of 1:1 to 1:0.1.

9. As a composition of matter, a catalytic mixture containing an aluminum compound having the formula $R_3Al$ wherein each R is a hydrocarbon radical containing 1 to 12 carbon atoms and selected from the group consisting of alkyl, aryl and aralkyl, a trihalide of a transition metal selected from the group consisting of titanium and vanadium and an organophosphorus compound having the formulas $P(O)Y_3$ and $PY_3$ wherein each Y is selected from the group consisting of alkylamino and alkoxy radicals, the alkyl and alkoxy radicals containing 1 to 8 carbon atoms, the molar ratio of transition metal trihalide to organophosphorus compound being within the range of 1:1 to 1:0.1.

10. As a composition of matter, a catalytic mixture of a trialkyl aluminum wherein the alkyl radicals contain 1 to 12 carbon atoms, a titanium trihalide and a trialkyl phosphite wherein the alkyl radicals contain 1 to 8 carbon atoms, the molar ratio of titanium trihalide to trialkyl phosphite being within the range of 1:1 to 1:0.1.

11. As a composition of matter, a catalytic mixture of a trialkyl aluminum wherein the alkyl radicals contain 1 to 12 carbon atoms, a titanium trihalide and a trialkyl phosphate wherein the alkyl radicals contain 1 to 8 carbon atoms, the molar ratio of titanium trihalide to trialkyl phosphate being within the range of 1:1 to 1:0.1.

12. As a composition of matter, a catalytic mixture of a trialkyl aluminum wherein the alkyl radicals contain 1 to 12 carbon atoms, a titanium trihalide and a hexaalkyl phosphoramide wherein the alkyl radicals contain 1 to 8 carbon atoms, the molar ratio of titanium trihalide to hexaalkyl phosphoramide being within the range of 1:1 to 1:0.1.

13. As a composition of matter, a catalytic mixture consisting essentially of triethyl aluminum, titanium trichloride and tris-N,N-dimethylphosphoramide, the molar ratio of titanium trichloride to tris-N,N-dimethylphosphoramide being within the range of 1:1 to 1:0.1.

14. As a composition of matter, a catalytic mixture consisting essentially of triethyl aluminum, vanadium trichloride and tris-N,N-dimethylphosphoramide, the molar ratio of vanadium trichloride to tris-N,N-dimethylphosphoramide being within the range of 1:1 to 1:0.1.

15. As a composition of matter, a catalytic mixture consisting essentially of triethyl aluminum, titanium trichloride and triethyl phosphate, the molar ratio of titanium trichloride to triethyl phosphate being within the range of 1:1 to 1:0.1.

16. As a composition of matter, a catalytic mixture consisting essentially of triethyl aluminum, titanium trichloride and triethyl phosphite, the molar ratio of titanium trichloride to triethyl phosphite being within the range of 1:1 to 1:0.1.

References Cited by the Examiner
UNITED STATES PATENTS

| | | | |
|---|---|---|---|
| 2,862,917 | 12/58 | Anderson et al. | 260—94.9 |
| 2,886,561 | 5/59 | Reynolds et al. | 260—94.9 |
| 2,969,345 | 1/61 | Coover et al. | 260—93.7 |
| 2,973,348 | 2/61 | Coover et al. | 260—93.7 |

JOSEPH L. SCHOFER, *Primary Examiner.*

M. LIEBMAN, WILLIAM H. SHORT, *Examiners.*